2,701,262
Patented Feb. 1, 1955

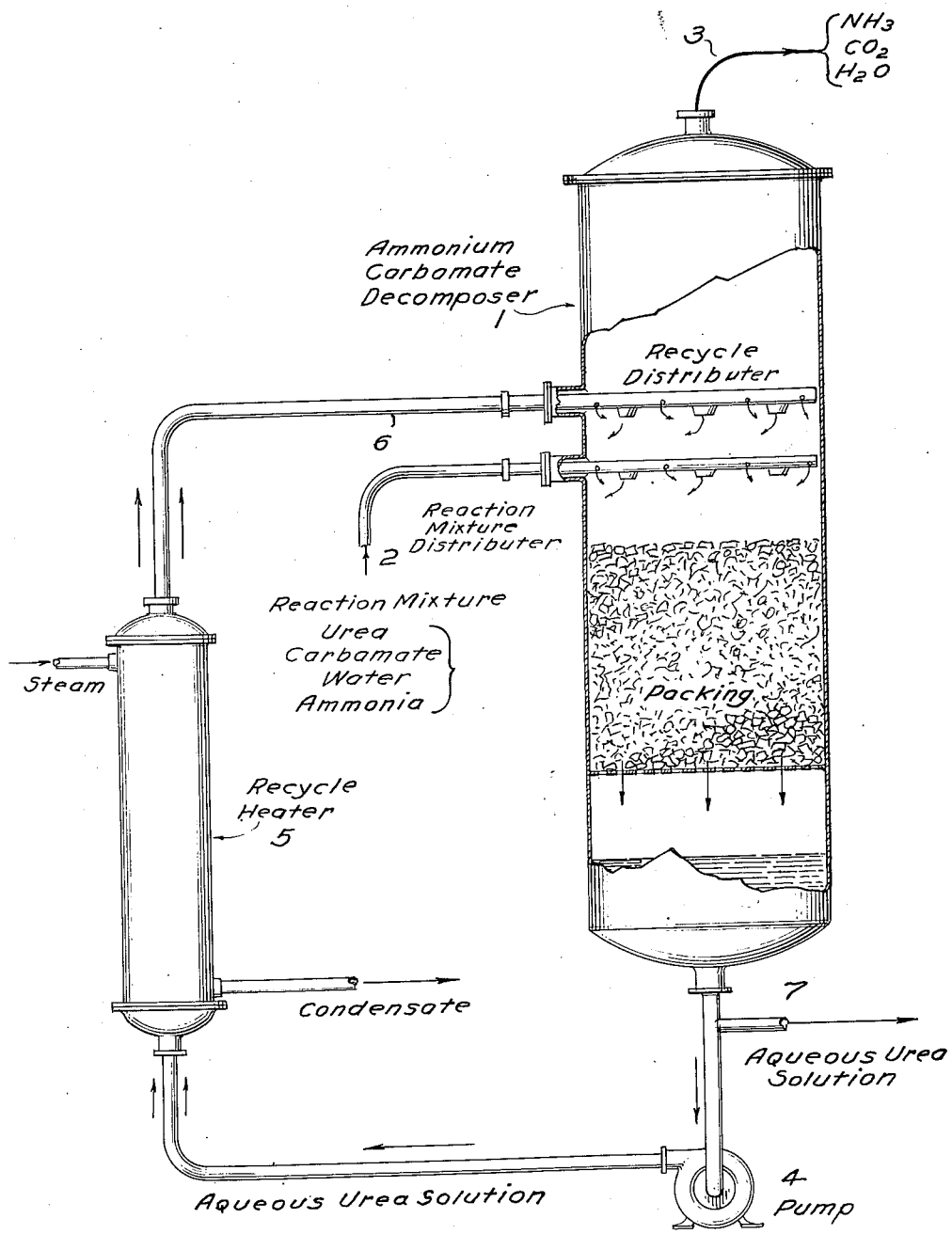

2,701,262

UREA PURIFICATION

Lucien H. Cook, Port Washington, N. Y., assignor to Chemical Construction Corporation, New York, N. Y., a corporation of Delaware Application February 2, 1953, Serial No. 334,519

4 Claims. (Cl. 260—555)

This invention is directed to the separation of ammonium carbamate from urea. More particularly the invention relates to the thermal decomposition of ammonium carbamate contained in aqueous solutions of urea, with subsequent distillation of ammonia, carbon dioxide, and water from the urea product.

In the well known synthesis of urea by heating ammonium carbamate under pressure, the conversion to urea is only partial, and the reaction mixture removed from the synthesis autoclave always contains unconverted ammonium carbamate, its distillation from the crude urea product is actually quite difficult on an industrial scale. Thus, it has been found that a simple distillation by application of heat to the still walls suffices to decompose only a fraction of the available ammonium carbamate, owing to the fact that the crude product in the still sets up solid after a portion of the volatile matter has been distilled out. The reason for the possibility of solids appearing during carbamate decomposition is that the carbamate decomposer is necessarily maintained at a pressure which is lower than the vapor pressure of the solution being handled. Hence, gases ($NH_3$, $CO_2$ and $H_2O$) will vaporize from the solution, and unless sufficient heat is supplied uniformly to the solution the temperature will drop and solids will crystallize. Prior art methods supplied this heat through a metal surface which usually meant high wall temperatures in order to keep the solution above the solidification temperature. The high temperature decomposed some of the urea. Also if the solution was not heated uniformally, solidification often occurred due to local cooling by vaporization.

Thus it has long been recognized in the urea industry that the efficient removal of ammonia and carbon dioxide and/or ammonium carbamate from crude urea required as two simultaneously existing conditions, low temperatures as well as the prevention of solid deposition in the mass being distilled. In the past, nearly every means for bringing about either condition automatically excluded the other, so that some rather complicated schemes and processes have been necessary to solve the problem on an industrial scale.

In the present invention the requisite heat is supplied uniformally by direct contact of the carbamate-containing solution with stripped solution.

It is an object of this invention to provide a simple and economical process by which urea reaction mixtures may be distilled with little or no decomposition of urea and with little or no deposition of solids.

Other objects and advantages of the invention will be apparent from the following description.

In accordance with the present invention the hot reaction mixture from the urea autoclave passes downward through a packed tower where it comes in intimate cocurrent contact with a still hotter aqueous solution of urea (actually, recycled "stripped" urea product). The packed tower is used in order to get intimate mixing of the two liquids and to permit ready removal of the $NH_3$ and $CO_2$ evolved. As the two liquids trickle down through the packing, nearly all of the available ammonia and carbon dioxide are vaporized, together with a portion of the byproduct water. The heat required for the vaporization is supplied by the recycled aqueous urea. The stripped liquid leaving the packed section consists of a solution of urea in water, with a little free $NH_3$. A portion of this liquid is withdrawn for further processing as desired; the rest is pumped through a shell and tube heat exchanger or the like where it is heated to the temperature required for the distillation of the reaction mixture, after which it is pumped to the packed column to treat the incoming crude urea reaction mixture. The distillation is thus readily conducted on a continuous basis.

The lower temperature limit at which the distillation may be conducted is fixed by the melting point of the aqueous urea solution (stripped urea product). This is 163° F. with an aqueous urea solution containing 77% urea by weight, 199° F. with an 85% urea solution, and 220° F. with a 90% urea solution. The upper temperature limit is fixed by the decomposition point of the urea in the solution, i. e., about 255° F. The temperature at which the distillation is conducted should be only a few degrees above the melting point of the solution being handled in order to prevent the formation of solids and decomposition of urea. The temperature to which the stripped reaction mixture is heated before contact with the incoming reaction mixture is thus only slightly higher, e. g., 8 to 10° F. higher, than the temperature at which the distillation is conducted. The pressure at which the distillation is conducted is determined by the amount of water desired in the distillate; a dryer gas being obtained at higher pressures.

Referring to the accompanying drawing, a decomposer 1 effects the actual distillation of reaction mixture delivered by a conduit 2. A vapor discharge 3 leads from this decomposer and a liquid outlet leads to a pump 4. The pump serves to pass stripped reaction mixture through a shell and tube heat exchanger 5 and back to the decomposer 1 via a conduit 6 which is located above the reaction mixture conduit 2. A portion of the stripped reaction mixture is withdrawn from the decomposer 1 via a conduit 7. Steam is introduced into the shell and tube heat exchanger 5 for heating the stripped reaction mixture.

While the manner of application of the invention can be varied widely, particularly as regards to specific operating conditions, the following example describes a preferred embodiment of the invention.

Example

A reaction mixture at a temperature of 230° F. containing 56% urea, 17% water, 25% ammonium carbamate, and 2% ammonia by weight is delivered by the conduit 2 at the rate of 5714 lb./hr. to the decomposer 1 which is maintained at approximately atmospheric pressure. Stripped reaction mixture (as described below) at about 222° F. is conducted by conduit 7 at the rate of 500,000 lb./hr. into the decomposer 1 at a point above the reaction mixture conduit 2. The stripped liquid is thereafter in intimate contact with the crude urea reaction mixture in the packed section of the decomposer 1, thereby supplying the heat required to decompose ammonia carbamate and to distill the resultant ammonia and carbon dioxide from the reaction mixture. The resulting distillate contains approximately 36% ammonia, 41% carbon dioxide, and 23% water (by weight). The liquid (temperature about 212° F.) leaving the packed section of the decomposer 1 is all stripped reaction mixture analyzing by weight approximately 85% urea, 14% water, and 1% ammonia. Sufficient of this liquid is withdrawn for recycling requirements and the remainder is recovered.

I claim:

1. In treating a crude urea, comprising urea, ammonium carbamate and water, to remove the said ammonium carbamate as a vapor mixture of ammonia and carbon dioxide, the improvement that comprises cocurrently passing both a flow of said crude urea and a flow of hot concentrated aqueous solution of substantially pure urea downwardly through a packed vapor-liquid contact zone, whereby ammonium carbamate in the crude urea product is decomposed to ammonia and carbon dioxide gases; removing ammonia and carbon dioxide gases upwardly from said zone and removing resultant purified urea product, comprising essentially urea in aqueous solution, from the lower levels of said zone.

2. A method according to claim 1 in which a portion of the recovered aqueous purified urea product solution is heated and recycled to the vapor-liquid contact zone as the flow of hot concentrated solution.

3. A method according to claim 2 in which the temperature of the crude urea product is supplied at about 230° F. and the temperature of the flow of heated recycled urea product solution is about 222° F.

4. A method according to claim 1 in which the temperature and rate of each flow is adjusted to produce in said contact zone a temperature at least sufficiently high to prevent freezing of solution therein but not more than about 255° F.

No references cited.